US011772600B2

United States Patent
Hasegawa et al.

(10) Patent No.: US 11,772,600 B2
(45) Date of Patent: Oct. 3, 2023

(54) VEHICLE CONTROL APPARATUS, VEHICLE CONTROL METHOD, RECORDING MEDIUM WITH PROGRAM FOR CONTROL RECORDED, AND VEHICLE CONTROL SYSTEM

(71) Applicant: HONDA MOTOR CO., LTD., Tokyo (JP)

(72) Inventors: Satoshi Hasegawa, Wako (JP); Seonghun Lee, Wako (JP); Katsuyasu Yamane, Wako (JP); Fumiaki Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 398 days.

(21) Appl. No.: 17/118,707

(22) Filed: Dec. 11, 2020

(65) Prior Publication Data
US 2021/0179014 A1 Jun. 17, 2021

(30) Foreign Application Priority Data
Dec. 17, 2019 (JP) .................................. 2019-227115

(51) Int. Cl.
*H04W 4/40* (2018.01)
*B60R 25/00* (2013.01)
(Continued)

(52) U.S. Cl.
CPC ............ *B60R 25/002* (2013.01); *B60R 25/24* (2013.01); *H04B 17/27* (2015.01); *H04W 4/40* (2018.02)

(58) Field of Classification Search
CPC .................................................. B60R 25/002
(Continued)

(56) References Cited

U.S. PATENT DOCUMENTS

2018/0096540 A1* 4/2018 Katou ..................... G07C 5/008
2018/0144570 A1* 5/2018 Oomi ..................... B60W 40/02

FOREIGN PATENT DOCUMENTS

| JP | 2007-146501 | 6/2007 |
| JP | 2014-054902 | 3/2014 |

(Continued)

OTHER PUBLICATIONS

Japanese Office Action dated Feb. 1, 2022, English translation included, 15 pages.

*Primary Examiner* — Qutbuddin Ghulamali
(74) *Attorney, Agent, or Firm* — Rankin, Hill & Clark LLP (57) ABSTRACT

A vehicle control apparatus includes a vehicle communication control unit performing communication with a mobile terminal positioning within an out-vehicle communication area, a distance measuring unit measuring a vehicle-terminal distance, the vehicle-terminal distance being a distance between a vehicle and the mobile terminal, and a distance measurement control unit measuring the vehicle-terminal distance by switching, based on a predetermined condition, between a first distance measurement mode repeatedly measuring the vehicle-terminal distance by the distance measuring unit without depending on reception of measurement instruction information transmitted from the mobile terminal and a second distance measurement mode measuring the vehicle-terminal distance by the distance measuring unit in response to reception of the measurement instruction information when communication is established between the vehicle communication control unit and the mobile terminal.

12 Claims, 5 Drawing Sheets

(51) Int. Cl.
*B60R 25/24* (2013.01)
*H04B 17/27* (2015.01)

(58) Field of Classification Search
USPC ...................................................... 455/456.6
See application file for complete search history.

(56) References Cited

FOREIGN PATENT DOCUMENTS

| | | |
|---|---|---|
| JP | 2014-151846 A | 8/2014 |
| JP | 2019-528387 | 10/2019 |

\* cited by examiner

VEHICLE CONTROL APPARATUS, VEHICLE CONTROL METHOD, RECORDING MEDIUM WITH PROGRAM FOR CONTROL RECORDED, AND VEHICLE CONTROL SYSTEM

INCORPORATION BY REFERENCE

The present application claims priority under 35 U.S.C. § 119 to Japanese Patent Application No. 2019-227115 filed on Dec. 17, 2019. The content of the application is incorporated herein by reference in its entirety.

BACKGROUND OF THE INVENTION

Field of the Invention

The present invention relates to a vehicle control apparatus, a vehicle control method, a recording medium with a program for control recorded, and a vehicle control system.

Description of the Related Art

Conventionally, a vehicle control system has been proposed that includes a security device and an interior reader/writer in a vehicle and thus enables operations on the vehicle by using a vehicle key and a mobile terminal such as a smartphone (see Japanese Patent Laid-Open No. 2014-54902, for example). In the vehicle control system, the security device permits locking/unlocking of a door with the vehicle key if authentication of the vehicle key is succeeded within a communication area outside of the vehicle. The security device further permits to start an engine of the vehicle with the vehicle key if the authentication of the vehicle key is succeeded within a communication area within the vehicle.

The interior reader/writer permits operations on the vehicle (such as locking/unlocking of a door and start of the engine) with the mobile terminal carried onto the vehicle if authentication via near field communication (NFC) with the mobile terminal is succeeded.

Although the operations on a vehicle with a mobile terminal are enabled when the mobile terminal is carried onto the vehicle in the conventional vehicle control system, enabling operations on the vehicle from outside of the vehicle with the mobile terminal like a vehicle key is also desired. With respect to a vehicle key, operations on a vehicle with the vehicle key can be permitted based on a distance between the vehicle and the vehicle key measured with relatively low power consumption achieved by a combination of low-frequency (LF) and ultra-high frequency (UHF). Therefore, also in order to enable operations on a vehicle from outside of the vehicle with a mobile terminal, enabling measurement of a distance between the vehicle and the mobile terminal with reduced power consumption is desirable.

The present invention has been made in view of such background, and it is an object of the present invention to provide a vehicle control apparatus, a vehicle control method, a recording medium with a program for control recorded, and a vehicle control system that enable measurement of a distance between a vehicle and a mobile terminal with reduced power consumption.

SUMMARY OF THE INVENTION

As a first aspect for achieving the object, there is provided a vehicle control apparatus including a vehicle communication control unit performing communication with a mobile terminal used by a user of a vehicle when the mobile terminal positions within an out-vehicle communication area within a predetermined distance from the vehicle, a distance measuring unit measuring a vehicle-terminal distance, the vehicle-terminal distance being a distance between the vehicle and the mobile terminal, and a distance measurement control unit measuring the vehicle-terminal distance by switching, based on a predetermined condition, between a first distance measurement mode repeatedly measuring the vehicle-terminal distance by the distance measuring unit without depending on reception, by the vehicle communication control unit, of measurement instruction information transmitted from the mobile terminal and a second distance measurement mode measuring the vehicle-terminal distance by the distance measuring unit in response to reception, by the vehicle communication control unit, of the measurement instruction information transmitted from the mobile terminal when communication is established between the vehicle communication control unit and the mobile terminal.

The vehicle control apparatus may further include a use estimated time period setting unit setting a use estimated time period being a period when it is estimated that the user uses the vehicle. In this case, as the predetermined condition, a first predetermined condition that a current time is within the use estimated time period may be set, and the distance measurement control unit may perform measurement of the vehicle-terminal distance by the first distance measurement mode if the first predetermined condition is satisfied.

The vehicle control apparatus may further include a locked/unlocked time recognizing unit recognizing a time when the vehicle is unlocked or locked. In this case, the use estimated time period setting unit may set the use estimated time period based on a time when the vehicle is unlocked or locked recognized by the locked/unlocked time recognizing unit.

The vehicle control apparatus may further include a schedule information obtaining unit obtaining schedule information including an action plan of the user. In this case, the use estimated time period setting unit may set the use estimated time period based on the schedule information obtained by the schedule information obtaining unit.

The vehicle control apparatus may further include a vehicle use presence/absence recognizing unit recognizing whether the vehicle is in use or not. In this case, the distance measurement control unit may perform measurement of the vehicle-terminal distance by the second distance measurement mode next time in a time period set as the use estimated time period if use of the vehicle is not recognized by the vehicle use presence/absence recognizing unit within the use estimated time period.

The vehicle control apparatus may include a vehicle use presence/absence recognizing unit recognizing whether the vehicle is in use or not, and a vehicle use plan information obtaining unit, if use of the vehicle is not recognized by the vehicle use presence/absence recognizing unit within the use estimated time period, transmitting vehicle use inquiry information inquiring about a plan for using the vehicle to the mobile terminal and obtaining, through the vehicle communication control unit, vehicle use answer information transmitted from the mobile terminal in response to reception of the vehicle use inquiry information. In this case, the use estimated time period setting unit may change the use estimated time period based on the vehicle use answer information.

In the vehicle control apparatus, the distance measurement control unit may perform measurement of the vehicle-terminal distance or limitation of measurement of the vehicle-terminal distance by switching, based on the predetermined condition, among a third distance measurement mode limiting measurement of the vehicle-terminal distance by the distance measuring unit, the first distance measurement mode and the second distance measurement mode.

The vehicle control apparatus may further include a vehicle use presence/absence recognizing unit recognizing whether the vehicle is in use or not. In this case, as the predetermined condition, a second predetermined condition is set, the second predetermined condition being that a state where it is recognized by the vehicle use presence/absence recognizing unit that the vehicle is not used continues for a predetermined period of time or longer, and the distance measurement control unit may limit measurement of the vehicle-terminal distance by switching to the third distance measurement mode if the second predetermined condition is satisfied while measurement of the vehicle-terminal distance is being performed by the first distance measurement mode or the second distance measurement mode.

The vehicle control apparatus may include a non-use estimated time period setting unit setting a non-use estimated time period being a time period estimated as that the user does not use the vehicle. In this case, as the predetermined condition, a third predetermined condition that a current time is within the non-use estimated time period may be set, and, if the third predetermined condition is satisfied, the distance measuring unit may limit measurement of the vehicle-terminal distance by the third distance measurement mode.

As a second aspect for achieving the object, there is provided a vehicle control method to be executed by a vehicle control apparatus performing communication with a mobile terminal used by a user of a vehicle, the method including a vehicle communication control step of performing communication with the mobile terminal when the mobile terminal positions within an out-vehicle communication area within a predetermined distance from the vehicle, a distance measuring step of measuring a vehicle-terminal distance, the vehicle-terminal distance being a distance between the vehicle and the mobile terminal, and a distance measurement control step of measuring the vehicle-terminal distance by switching, based on a predetermined condition, between a first distance measurement mode repeatedly measuring the vehicle-terminal distance by the distance measuring step without depending on reception, by the vehicle communication control step, of measurement instruction information transmitted from the mobile terminal and a second distance measurement mode measuring the vehicle-terminal distance by the distance measuring step in response to reception, by the vehicle communication control step, of the measurement instruction information transmitted from the mobile terminal when communication is established between the vehicle control apparatus and the mobile terminal by the vehicle communication control step.

As a third aspect for achieving the object, there is provided a recording medium with a program for control recorded, the recording medium being installed in a vehicle control apparatus performing communication with a mobile terminal used by a user of a vehicle, the program causing the vehicle control apparatus to function as a vehicle communication control unit performing communication with the mobile terminal when the mobile terminal positions within an out-vehicle communication area within a predetermined distance from the vehicle, a distance measuring unit measuring a vehicle-terminal distance, the vehicle-terminal distance being a distance between the vehicle and the mobile terminal, and a distance measurement control unit measuring the vehicle-terminal distance by switching, based on a predetermined condition, between a first distance measurement mode repeatedly measuring the vehicle-terminal distance by the distance measuring unit without depending on reception, by the vehicle communication control unit, of measurement instruction information transmitted from the mobile terminal and a second distance measurement mode measuring the vehicle-terminal distance by the distance measuring unit in response to reception, by the vehicle communication control unit, of the measurement instruction information transmitted from the mobile terminal when communication is established between the vehicle communication control unit and the mobile terminal.

As a fourth aspect for achieving the object, there is provided a vehicle control system including a mobile terminal used by a user of a vehicle, and a vehicle control apparatus mounted on the vehicle and having a vehicle communication control unit performing communication with the mobile terminal, and a distance measuring unit measuring a vehicle-terminal distance, the vehicle-terminal distance being a distance between the vehicle and the mobile terminal, wherein the mobile terminal and the vehicle communication control unit establish communication when the mobile terminal positions within an out-vehicle communication area of the vehicle communication control unit within a predetermined distance from the vehicle, the mobile terminal transmits, to the vehicle communication control unit, measurement instruction information instructing to measure the vehicle-terminal distance by the distance measuring unit if a predetermined distance measurement execution condition is satisfied, and the vehicle control apparatus has a distance measurement control unit measuring the vehicle-terminal distance by switching, based on a predetermined condition, between a first distance measurement mode repeatedly measuring the vehicle-terminal distance by the distance measuring unit without depending on reception, by the vehicle communication control unit, of the measurement instruction information transmitted from the mobile terminal and a second distance measurement mode measuring the vehicle-terminal distance by the distance measuring unit in response to reception, by the vehicle communication control unit, of the measurement instruction information transmitted from the mobile terminal when communication is established between the vehicle communication control unit and the mobile terminal.

According to the above-described vehicle control apparatus, the first distance measurement mode repeatedly measuring the vehicle-terminal distance by the distance measuring unit without depending on reception, by the vehicle communication control unit, of measurement instruction information transmitted from the mobile terminal and the second distance measurement mode measuring the vehicle-terminal distance by the distance measuring unit in response to reception, by the vehicle communication control unit, of the measurement instruction information transmitted from the mobile terminal are switched by the distance measurement control unit based on a predetermined condition when communication is established between the vehicle communication control unit and the mobile terminal. Thus, power consumption required for measurement of the vehicle-terminal distance can be reduced more than a case where the vehicle-terminal distance is repeatedly measured unconditionally by the first distance measurement mode when communication is established between the vehicle communication control unit and the mobile terminal.

DETAILED DESCRIPTION OF THE PREFERRED EMBODIMENT

1. Measurement of Distance Between Vehicle and Mobile Terminal

Figure 1:
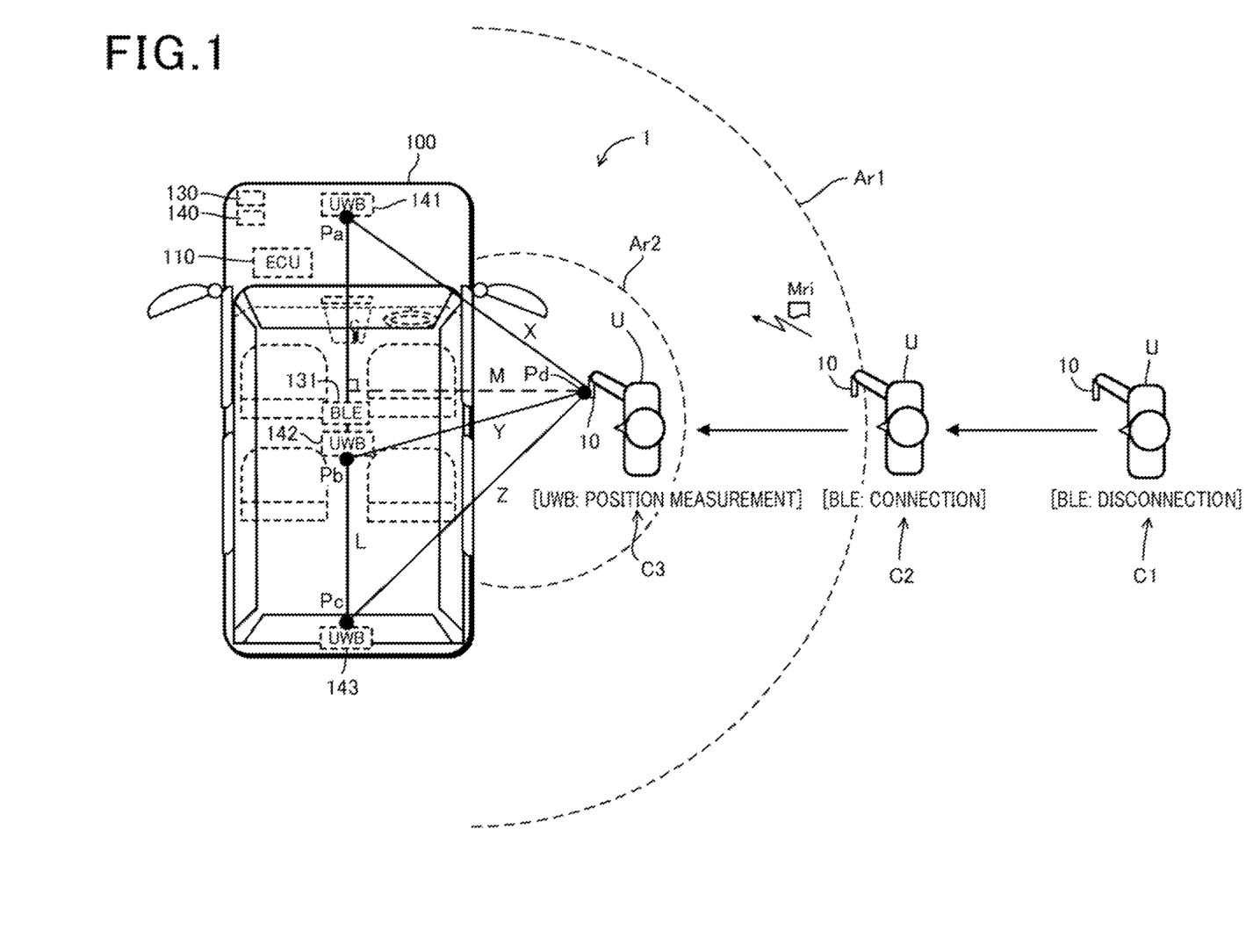
FIG. 1 is an explanatory diagram of an aspect in which a vehicle control apparatus measures a distance between a vehicle and a mobile terminal.

With reference to FIG. 1, an aspect is described in which a vehicle-terminal distance M being a distance between a vehicle 100 and a mobile terminal 10 is measured in a vehicle control system 1 including a vehicle control apparatus 110 provided in the vehicle 100 and the mobile terminal 10 used by a user U of the vehicle 100. The vehicle control apparatus 110 is an electronic control unit (ECU) including a central processing unit (CPU), a memory, an interface circuit, and so on, not shown, and controlling operations of the vehicle 100.

The vehicle control apparatus 110 measures the vehicle-terminal distance M by performing communication with the mobile terminal 10 used by the user U of the vehicle 100. The mobile terminal 10 is, for example, a smartphone, a mobile phone, a tablet terminal, or a wearable device such as a smart watch and is carried or worn by the user U for use.

An electronic key application (app) is installed in the mobile terminal 10, and the mobile terminal 10 can function as an electronic key including a function that remotely operates the vehicle 100 by executing the electronic key app. The vehicle 100 and the mobile terminal 10 mutually perform communication by communication specifications of Bluetooth Low Energy (BLE where Bluetooth is a registered trademark) and Ultra Wide Band (UWB). In UWB communication, a band of 500 MHz to ten-odd GHz (such as around an 8 GHz band) is used.

The vehicle 100 includes a first vehicle communication unit 130 performing communication by BLE, and a second vehicle communication unit 140 performing communication by UWB. The vehicle 100 has a BLE antenna 131 connected to the first vehicle communication unit 130 and UWB antennas 141, 142 and 143 connected to the second vehicle communication unit 140. The BLE antenna 131 is arranged substantially in a center part of the vehicle 100. The UWB antenna 141 is arranged in a front part of the vehicle 100, the UWB antenna 142 is arranged in the center part of the vehicle 100, and the UWB antenna 143 is arranged in a rear part of the vehicle 100.

The vehicle control apparatus 110 performs polling by BLE communication through the first vehicle communication unit 130, and, when the mobile terminal 10 enters from outside (the state indicated by C1) to inside (the state indicated by C2) of an out-vehicle communication area Ar1 of BLE communication by the first vehicle communication unit 130, establishes communication by BLE with the mobile terminal 10.

The vehicle control apparatus 110 confirms that the mobile terminal 10 is registered as an electronic key of the vehicle 100 by performing authentication of the electronic key between the vehicle control apparatus 110 and the mobile terminal 10. More specifically, the vehicle control apparatus 110 confirms that the mobile terminal 10 is registered as an electronic key of the vehicle 100 by comparing an authentication code transmitted from the mobile terminal 10 and an authentication code saved in the memory of the vehicle control apparatus 110.

The vehicle control apparatus 110 measures the vehicle-terminal distance M in order to permit use of the mobile terminal 10 as an electronic key. The vehicle control apparatus 110 performs UWB communication through the second vehicle communication unit 140 with the mobile terminal 10 and measures a distance X between the UWB antenna 141 and the mobile terminal 10, a distance Y between the UWB antenna 142 and the mobile terminal 10, and a distance Z between the UWB antenna 143 and the mobile terminal 10 based on Time of Flight (ToF). Because a position Pa of the UWB antenna 141, a position Pb of the UWB antenna 142 and a position Pc of the UWB antenna 143 in the vehicle 100 are known, a relative position Pd of the mobile terminal 10 with respect to the vehicle 100 is calculated by trilateration by measuring X, Y and Z, and the vehicle-terminal distance M can thus be measured with high precision.

When communication by BLE is established between the first vehicle communication unit 130 and the mobile terminal 10, the vehicle control apparatus 110 measures the vehicle-terminal distance M by performing UWB communication between the second vehicle communication unit 140 and the mobile terminal 10. When the vehicle control apparatus 110 recognizes that the mobile terminal 10 has entered a monitoring area Ar2 near the vehicle 100, as indicated by C3, from the vehicle-terminal distance M measured through UWB communication, the vehicle control apparatus 110 permits use of the mobile terminal 10 as the electronic key.

Thus, the user U can unlock and lock a door of the vehicle 100, open and close an electric door (such as a power slide door, a power hinge door or a power tail gate), start the engine, turn on/off an air conditioner, and cause a buzzer to go off, for example, by operating the mobile terminal 10. When the vehicle control apparatus 110 recognizes that the mobile terminal 10 has entered the monitoring area Ar2, the vehicle control apparatus 110 performs processing for, for example, putting on a welcome light (not shown) included in the vehicle 100.

The mobile terminal 10 transmits, to the vehicle 100, measurement instruction information Mri instructing measurement of the vehicle-terminal distance M if the mobile terminal 10 has a predetermined state, the details of which are described below. When communication by BLE is established between the vehicle control apparatus 110 and the mobile terminal 10, the vehicle control apparatus 110 performs processing for reducing power consumption required for measurement of the vehicle-terminal distance M by switching, based on a predetermined condition, among a first distance measurement mode repeatedly measuring the vehicle-terminal distance M every predetermined sampling time without depending on reception of the measurement instruction information Mri, a second distance measurement mode measuring the vehicle-terminal distance M in response to reception of the measurement instruction information Mri, and a third distance measurement mode limiting the measurement of the vehicle-terminal distance M. The limiting of the measurement of the vehicle-terminal distance M is performed by a measure such as inhibiting measurement of the vehicle-terminal distance M or increasing the sampling time for measuring the vehicle-terminal distance M more than that of the first distance measurement mode.

2. Configuration of Mobile Terminal

Figure 2:
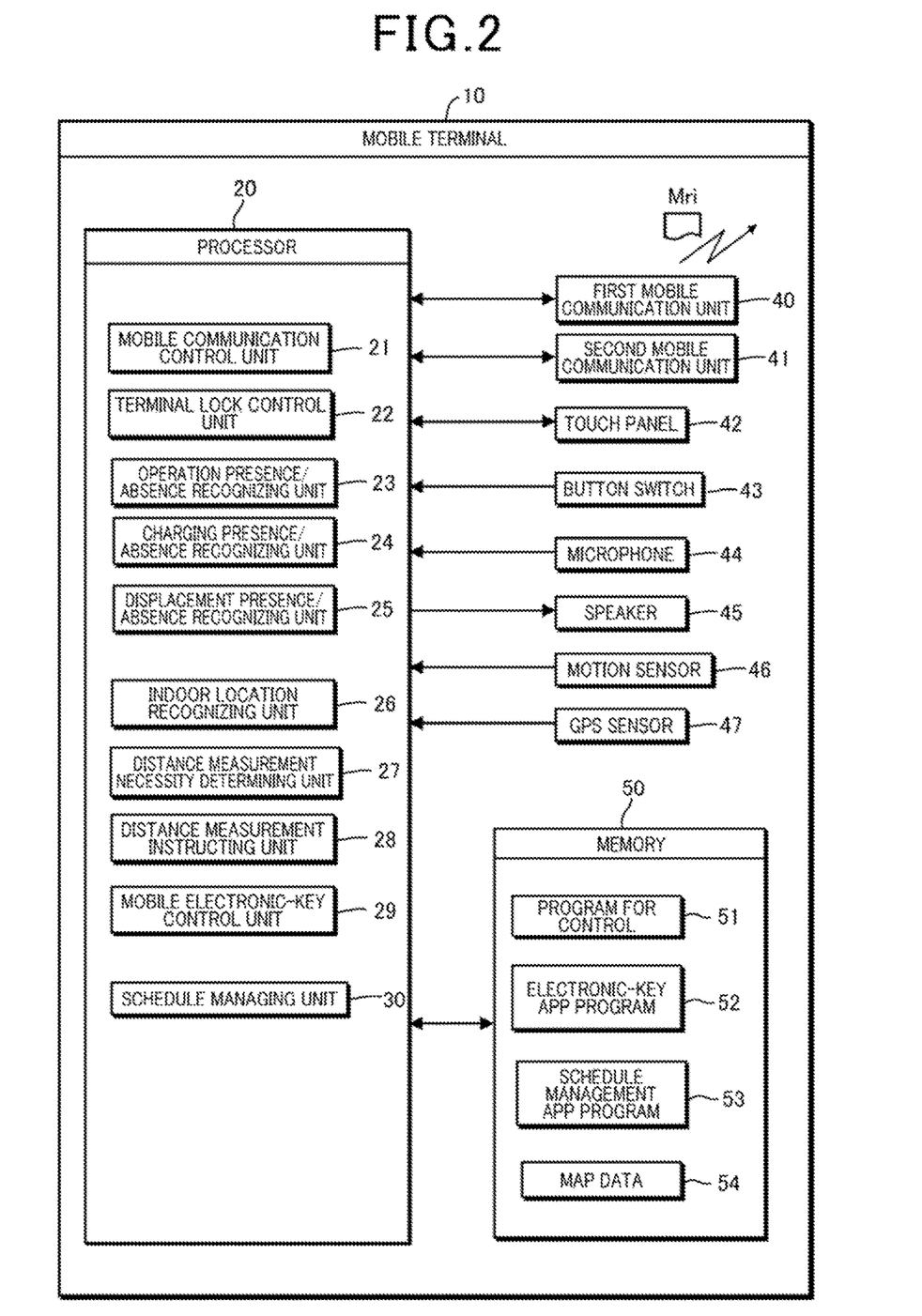
FIG. 2 is an explanatory diagram of a configuration of the mobile terminal.

With reference to FIG. 2, a configuration of the mobile terminal 10 is described. The mobile terminal 10 includes a processor 20, a memory 50, a first mobile communication unit 40, a second mobile communication unit 41, a touch panel 42, a button switch 43, a microphone 44, a speaker 45, a motion sensor 46, and a global positioning system (GPS) sensor 47.

The first mobile communication unit 40 performs BLE communication, and the second mobile communication unit 41 performs UWB communication. The touch panel 42 has a touch sensor on a surface of a flat-type display part such as a liquid crystal panel, and a detection signal from the touch sensor in accordance with an operation by the user U is input to the processor 20, and screen display by the display part is controlled in accordance with a display control signal from the processor 20.

The button switch 43 inputs an operation signal in accordance with an operation by the user U to the processor 20. The microphone 44 receives input of sound such as voice of the user U and inputs the sound signal to the processor 20. The speaker 45 outputs an alarm sound in accordance with a sound output control signal from the processor 20. The motion sensor 46 includes an acceleration sensor or an angular velocity sensor and detects a displacement of the mobile terminal 10. The GPS sensor 47 receives a signal transmitted from a GPS satellite and detects a current position of the mobile terminal 10.

In the memory 50, a program for control 51 for the mobile terminal 10, a program (electronic-key app program) 52 for the above-described electronic key app, and a program (schedule management app program) 53 for a schedule management app that manages schedule including an action plan of the user U are stored. The processor 20 reads and executes the program for control to function as a mobile communication control unit 21, a terminal lock control unit 22, an operation presence/absence recognizing unit 23, a charging presence/absence recognizing unit 24, and a displacement presence/absence recognizing unit 25.

The mobile communication control unit 21 performs control over BLE communication through the first mobile communication unit 40 and performs control over UWB communication through the second mobile communication unit 41. The terminal lock control unit 22 switches the mobile terminal 10 between an unlocked state in which an operation by the user U is received and a locked state in which reception of an operation excluding an unlock operation by the user U is inhibited. The terminal lock control unit 22 switches the mobile terminal 10 to the locked state if a state with no operation on the mobile terminal 10 by the user U continues for a first predetermined period of time or longer. The terminal lock control unit 22 switches from the locked state to the unlocked state if the unlock operation is performed by the user U in the locked state. As the unlock operation, input of a personal identification number (PIN), fingerprint authentication, face authentication or the like is adopted.

The operation presence/absence recognizing unit 23 detects whether an operation on the touch panel 42, an operation on the button switch 43 or an operation by sound input to the microphone 44 is performed by the user U or not. The displacement presence/absence recognizing unit 25 recognizes whether the mobile terminal 10 is displaced or not based on a detection signal from the motion sensor 46. The charging presence/absence recognizing unit 24 recognizes whether a battery (not shown) provided in the mobile terminal 10 is being charged or not in accordance with, for example, the detection state of charging current to the battery by a current sensor (not shown) provided in the mobile terminal 10.

The processor 20 reads and executes the electronic-key app program 52 to function as an indoor location recognizing unit 26, a distance measurement necessity determining unit 27, a distance measurement instructing unit 28, and a mobile electronic-key control unit 29.

The indoor location recognizing unit 26 determines whether the mobile terminal 10 is located indoors or not based on a current position of the mobile terminal 10 detected by the GPS sensor 47 and map data 54. The indoor location recognizing unit 26 recognizes that the mobile terminal 10 is located indoors if, for example, the current position of the mobile terminal 10 is within a radius of several meters (such as 5 meters) from a reference position of a building in the map data 54. Alternatively, the indoor location recognizing unit 26 recognizes that the mobile terminal 10 is located indoors if the current position of the mobile terminal 10 is within an area surrounded by an outer frame of a building in the map data 54.

The distance measurement necessity determining unit 27 determines whether or not the mobile terminal 10 has the following first to fifth predetermined states when the mobile terminal 10 positions within the out-vehicle communication area Ar1 (see FIG. 1) and BLE communication is established between the mobile terminal 10 and the vehicle 100.

If the mobile terminal 10 has at least one state (distance measurement necessary state) of the following first to third predetermined states, the distance measurement necessity determining unit 27 determines that it is necessary to measure the vehicle-terminal distance M.

First predetermined state: The mobile terminal 10 has the locked state. Because the mobile terminal 10 is not operated when the mobile terminal 10 has the locked state, it is estimated that the user U has approached the vehicle 100 for using the vehicle 100.

Second predetermined state: State (no-operation state) in which a state where an operation is not recognized by the operation presence/absence recognizing unit 23 continues for a second predetermined period of time or longer. Because it corresponds to a state where the mobile terminal 10 is not operated, it is estimated that the user U has approached the vehicle 100 for using the vehicle 100.

Third predetermined state: State (electronic-key-app operation state) in which the electronic key app is in operation. If the mobile terminal 10 is in the electronic-key-app operation state, it is estimated that the electronic key app is started for using the vehicle 100 by the user U.

If the mobile terminal 10 has at least one state (distance measurement unnecessary state) of the following fourth and fifth predetermined states, the distance measurement necessity determining unit 27 determines that it is not necessary to measure the vehicle-terminal distance M.

Fourth predetermined state: State (no-displacement state) in which the displacement presence/absence recognizing unit 25 does not recognize that the mobile terminal 10 is displaced. If the mobile terminal 10 has the no-displacement state, it is estimated that it is not a state where the user U is carrying the mobile terminal 10 and is approaching the vehicle 100 for using the vehicle 100.

Fifth predetermined state: State (indoor charged state) in which the charging presence/absence recognizing unit 24 recognizes that the mobile terminal 10 is being charged and the indoor location recognizing unit 26 recognizes that the mobile terminal 10 is located indoors. If the mobile terminal 10 has the indoor charged state, it is estimated that it is not a state where the mobile terminal 10 is used as the electronic key. For example, such a state is acquired when the vehicle 100 is parked by a house and while the mobile terminal 10 is being charged within the out-vehicle communication area Ar1 of the first vehicle communication unit 130 within the house.

If the charging presence/absence recognizing unit 24 recognizes that the mobile terminal 10 is being charged, there is a high possibility that the mobile terminal 10 is being charged indoors, and it is presumed that it is not a state where the user U uses the mobile terminal 10 as the electronic key. Thus, the indoor location recognizing unit 26 may be omitted, and if the charging presence/absence recognizing unit 24 recognizes that the mobile terminal 10 is being charged (charging presence state), the distance measurement necessity determining unit 27 may determine that it is not necessary to measure a relative position Pd of the mobile terminal 10 with respect to the vehicle 100.

If the distance measurement necessity determining unit 27 determines that it is necessary to measure the vehicle-terminal distance M, the distance measurement instructing unit 28 transmits the measurement instruction information Mri that instructs to measure the vehicle-terminal distance M to the vehicle 100. The mobile electronic-key control unit 29 transmits remote operation instruction information that instructs a remote operation on the vehicle 100 to the first vehicle communication unit 130.

The processor 20 reads and executes the schedule management app program 53 stored in the memory 50 to function as a schedule managing unit 30. The schedule managing unit 30 stores, in the memory 50, schedule information indicating schedule of the user U set by an input operation or the like on the touch panel 42 by the user U. The schedule information includes an action plan using the vehicle 100 by the user U. The schedule managing unit 30 transmits the schedule information to the vehicle 100 through the first mobile terminal communication unit 40 in response to a request from the vehicle 100. The schedule information is stored in the memory 50. The schedule information may be stored in a management server (not shown) connected to the mobile terminal 10 over a communication network.

3. Configuration of Vehicle

Figure 3:
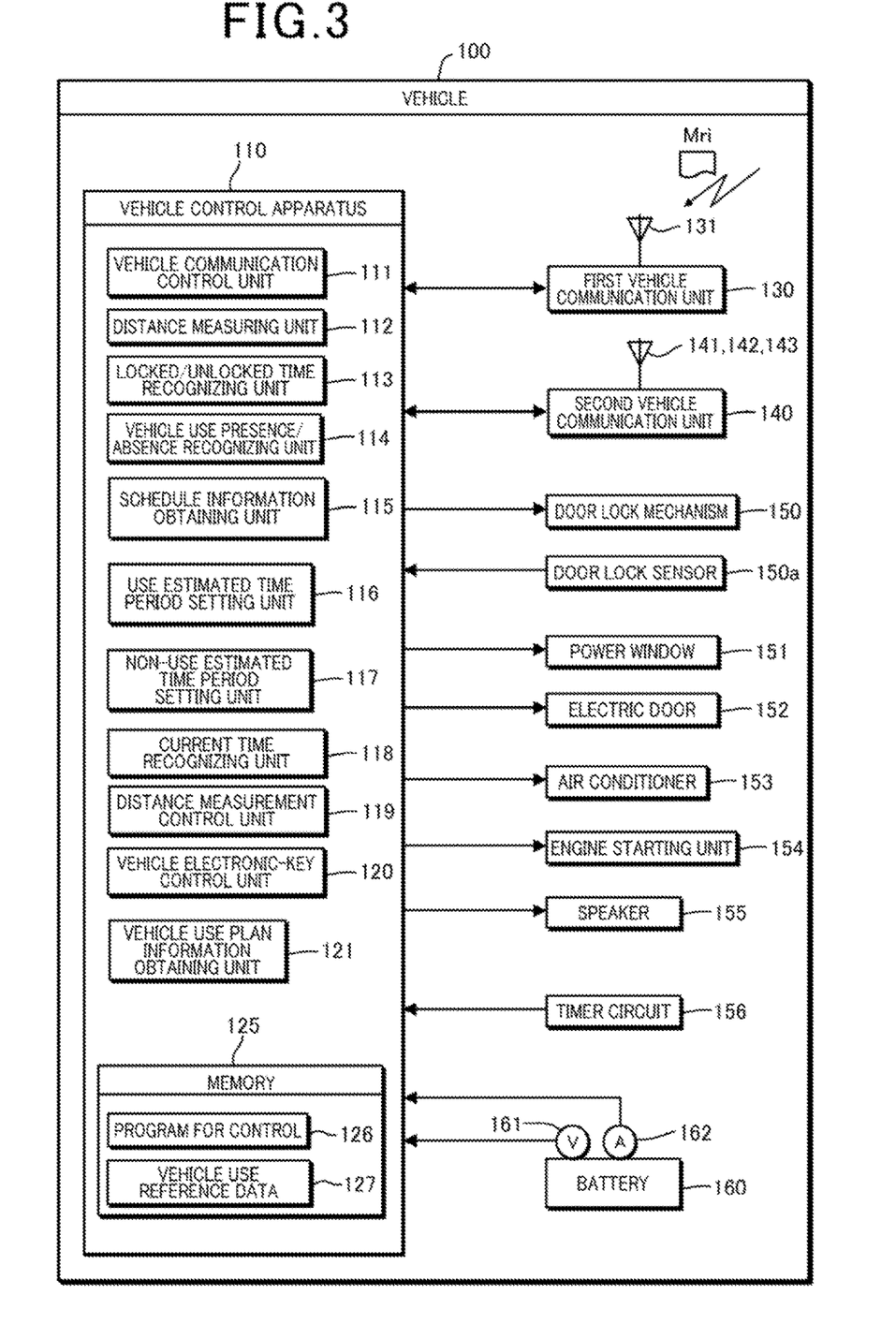
FIG. 3 is an explanatory diagram of a configuration of the vehicle on which the vehicle control apparatus is mounted.

With reference to FIG. 3, a configuration of the vehicle 100 on which the vehicle control apparatus 110 is mounted is described. The vehicle 100 includes, in addition to the vehicle control apparatus 110, the first vehicle communication unit 130 and the second vehicle communication unit 140 described above, a door lock mechanism 150, a power window 151, an electric door 152 (such as a power slide door, a power hinge door or a power tail gate), an air conditioner 153, an engine starting unit 154, a speaker 155, a timer circuit 156, and a battery 160.

The timer circuit 156 counts pulse signals output from a transmitter, not shown, and inputs the count signal to the vehicle control apparatus 110. The battery 160 provides power supply to the vehicle control apparatus 110, the first vehicle communication unit 130, the second vehicle communication unit 140, and so on. The battery 160 has a voltage sensor 161 that detects inter-terminal voltage in the battery 160 and a current sensor 162 that detects input and output currents of the battery 160.

The CPU (not shown) provided in the vehicle control apparatus 110 reads and executes a program for control 126 for the vehicle 100 stored in a memory 125 (recording medium) to function as a vehicle communication control unit 111, a distance measuring unit 112, a locked/unlocked time recognizing unit 113, a vehicle use presence/absence recognizing unit 114, a schedule information obtaining unit 115, a use estimated time period setting unit 116, a non-use estimated time period setting unit 117, a current time recognizing unit 118, a distance measurement control unit 119, and a vehicle electronic-key control unit 120. The program for control 126 may be recorded in an external recording medium (flash memory, magnetic disk, optical disk or the like), and transferred from the external recording medium to the memory 125.

Processing to be executed by the vehicle communication control unit 111 corresponds to a vehicle communication control step in a vehicle control method of the present invention, and processing to be executed by the distance measuring unit 112 corresponds to a distance measuring step in the vehicle control method of the present invention. Processing to be executed by the distance measurement control unit 119 corresponds to a distance measurement control step in the vehicle control method of the present invention.

The vehicle communication control unit 111 performs control over BLE communication through the first vehicle communication unit 130 and performs control over UWB communication through the second vehicle communication unit 140. The distance measuring unit 112 measures the vehicle-terminal distance M by performing UWB communication with the mobile terminal 10 through the second vehicle communication unit 140 and the vehicle communication control unit 111 as described above with reference to FIG. 1.

Pairing by BLE communication between the vehicle control apparatus 110 and the mobile terminal 10 is performed by transmitting a polling signal to the mobile terminal 10 by the vehicle communication control unit 111 and receiving, by the vehicle communication control unit 111, a response signal transmitted from the mobile terminal 10 having received the polling signal. In the mobile terminal 10, the mobile communication control unit 21 receives the polling signal from the vehicle 100 through the first mobile communication unit 40 and transmits a response signal to the vehicle 100 through the first mobile communication unit 40. As the procedure of the pairing, the pairing between the vehicle 100 and the mobile terminal 10 may be performed by transmitting a polling signal from the mobile terminal 10 and receiving, by the mobile terminal 10, a response signal transmitted from the vehicle 100 having received the polling signal.

The locked/unlocked time recognizing unit 113 recognizes an unlocked time and a locked time of a door of the vehicle 100 based on detection signals of locking and unlocking of the door lock mechanism 150 output from a door lock sensor 150*a*. Then, the locked/unlocked time recognizing unit 113 records the information on the recognized unlocked time and locked time in vehicle use reference data 127 stored in the memory 125.

The vehicle use presence/absence recognizing unit 114 recognizes whether the vehicle 100 is in use or not based on, for example, an ON/OFF state of an ignition switch (not shown) of the vehicle 100. The schedule information obtaining unit 115 obtains schedule information from the mobile terminal 10 by performing BLE communication with the mobile terminal 10 through the vehicle communication control unit 111 and the first vehicle communication unit 130 and records the schedule information in the vehicle use reference data 127.

A use estimated time period setting unit 116 sets a use estimated time period, which is a time period estimated as having a high possibility that the user U uses the vehicle 100, with reference to the information on the unlocked time and locked time of the door of the vehicle 100 and the schedule information recorded in the vehicle use reference data 127. The non-use estimated time period setting unit 117 sets a non-use estimated time period, which is a time period estimated as having a low possibility that the user U uses the vehicle 100, with reference to the information on the unlocked time and locked time of the door of the vehicle 100 and the schedule information recorded in the vehicle use reference data 127.

For example, in a case where the user U uses the vehicle 100 for driving to and from work, the use estimated time period setting unit 116 recognizes a time period from 8:00 AM to 9:00 AM and a time period from 5:00 PM to 6:00 PM that are commuting time periods on weekdays from the schedule information and sets them as use estimated time periods. The non-use estimated time period setting unit 117 recognizes a time period from 9:00 AM to 5:00 PM that is working hours on weekdays from the schedule information and sets it as a non-use estimated time period.

The current time recognizing unit 118 recognizes a current time based on a count signal output from the timer circuit 156. The distance measurement control unit 119 performs measurement of the vehicle-terminal distance M and the limitation of the measurement by switching among the first distance measurement mode, the second distance measurement mode, and the third distance measurement mode based on the use estimated time period set by the use estimated time period setting unit 116, the non-use estimated time period set by the non-use estimated time period setting unit 117, and a use state of the vehicle 100 recognized by the vehicle use presence/absence recognizing unit 114.

The vehicle electronic-key control unit 120 permits a remote operation on the vehicle 100 with the mobile terminal 10 by performing the electronic-key authentication processing described above between the vehicle electronic-key control unit 120 and the mobile electronic-key control unit 29 in the mobile terminal 10. Then, when receiving remote operation instruction information transmitted from the mobile terminal 10, the vehicle electronic-key control unit 120 controls an operation of the vehicle 100 in accordance with details of the instruction based on the remote operation instruction information. The remote operation instruction information instructs an operation of the door lock mechanism 150, the power window 151, the electric door 152, the air conditioner 153, the engine starting unit 154, and the speaker 155, for example.

A vehicle use plan information obtaining unit 121 transmits vehicle use inquiry information that inquires about a use plan of the vehicle 100 to the mobile terminal 10 if the use of the vehicle 100 is not recognized within the use estimated time periods by the vehicle use presence/absence recognizing unit 114. Then, the vehicle use plan information obtaining unit 121 obtains vehicle use answer information transmitted from the mobile terminal 10 in response to the reception of the vehicle use inquiry information. The use estimated time period setting unit 116 changes the use estimated time period based on the use plan of the vehicle 100 by the user U recognized from the vehicle use answer information.

4. Distance Measurement Processing between Vehicle and Mobile Terminal

Figure 4:
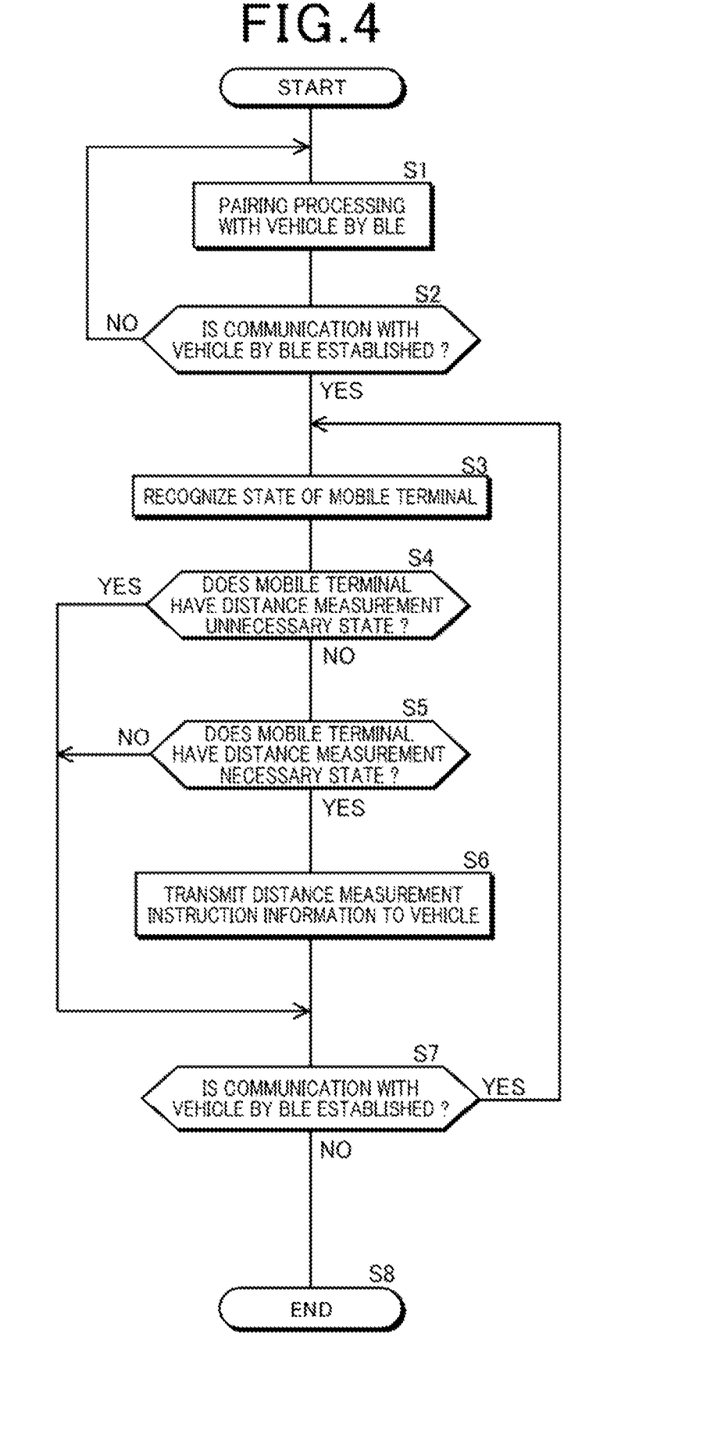
FIG. 4 is a flowchart of processing of transmitting measurement instruction information by the mobile terminal.
Figure 5:
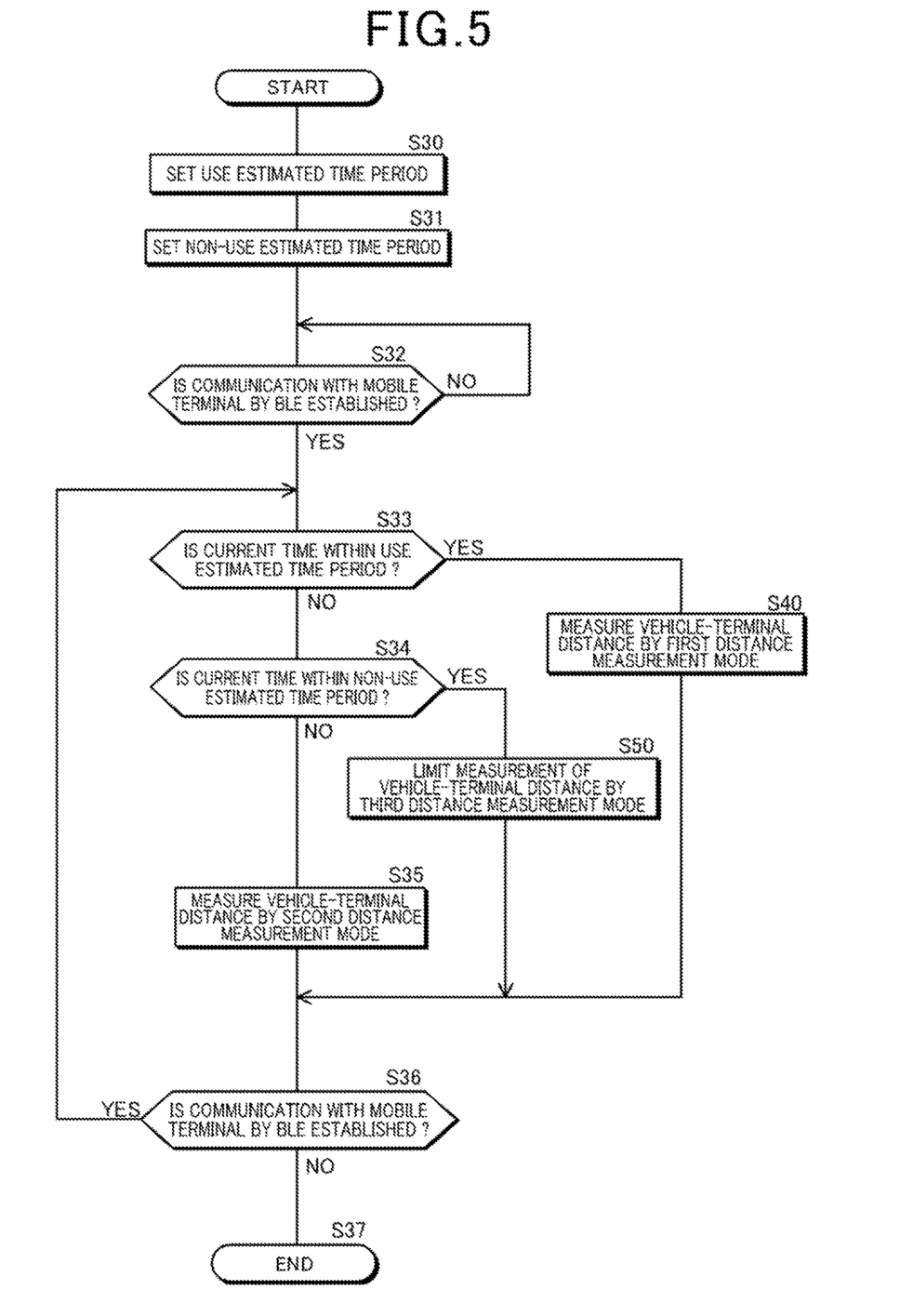
FIG. 5 is a flowchart of processing of measuring a distance between the vehicle and the mobile terminal by the vehicle control apparatus.

With reference to flowcharts shown in FIGS. 4 and 5, distance measurement processing between the vehicle 100 and the mobile terminal 10 is described. The mobile terminal 10 transmits measurement instruction information Mri that instructs to measure the vehicle-terminal distance M to the vehicle 100 by executing the processing based on the flowchart shown in FIG. 4.

In step S1 in FIG. 4, the mobile communication control unit 21 performs the pairing by BLE communication by transmitting a response signal to the vehicle control apparatus 110 through the first mobile communication unit 40 in response to reception, through the first mobile communication unit 40, of a polling signal transmitted from the vehicle control apparatus 110. When BLE communication with the vehicle 100 is established by the pairing in the subsequent step S2, the mobile communication control unit 21 advances the processing to step S3.

In step S3, the distance measurement necessity determining unit 27 recognizes whether the mobile terminal 10 has the first to fifth predetermined states or not. In the next step S4, the distance measurement necessity determining unit 27 determines whether the mobile terminal 10 has the distance measurement unnecessary state (at least one state of the fourth and fifth predetermined states) or not.

If the mobile terminal 10 has the distance measurement unnecessary state, the distance measurement necessity determining unit 27 advances the processing to step S7. In this case, the measurement instruction information Mri is not transmitted to the vehicle 100. On the other hand, if the mobile terminal 10 does not have the distance measurement unnecessary state, the distance measurement necessity determining unit 27 advances the processing to step S5 where whether the mobile terminal 10 has the distance measurement necessary state (at least one state of the first to third predetermined states) or not is determined. If the mobile terminal 10 has the distance measurement necessary state, the distance measurement necessity determining unit 27 advances the processing to step S6.

The distance measurement instructing unit 28 transmits the measurement instruction information Mri to the vehicle 100 in step S6 and advances the processing to step S7. In step S7, the distance measurement necessity determining unit 27 determines whether the communication by BLE with the vehicle 100 is established or not. If the communication by BLE with the vehicle 100 is established, the distance measurement necessity determining unit 27 advances the processing to step S3 and executes the processing in step S3 and subsequent steps again. On the other hand, if the communication by BLE between the vehicle 100 and the mobile terminal 10 is disconnected, the distance measurement necessity determining unit 27 advances the processing to step S8 and exits the processing by the flowchart in FIG. 4.

Next, the vehicle control apparatus 110 provided in the vehicle 100 measures the vehicle-terminal distance M by executing the processing by the flowchart shown in FIG. 5. In step S30 in FIG. 5, the use estimated time period setting unit 116 sets a use estimated time period based on the information on the locked time and unlocked time recorded in the vehicle use reference data 127 by the locked/unlocked time recognizing unit 113 and the schedule information recorded in the vehicle use reference data 127 by the schedule information obtaining unit 115.

In the subsequent step S31, the non-use estimated time period setting unit 117 sets a non-use estimated time period based on the information on the locked time and unlocked time recorded in the vehicle use reference data 127 by the locked/unlocked time recognizing unit 113 and the schedule information recorded in the vehicle use reference data 127 by the schedule information obtaining unit 115.

If BLE communication with the mobile terminal 10 is established by the pairing in the next step S32, the vehicle communication control unit 111 advances the processing to the step S33. In the subsequent steps S33 to S36, S40 and S50, processing by the distance measurement control unit 119 is performed. In step S33, the distance measurement control unit 119 determines whether the current time recognized by the current time recognizing unit 118 is within the use estimated time period or not. The condition that the current time is within the use estimated time period corresponds to a first predetermined condition of the present invention.

If the current time is within the use estimated time period, the distance measurement control unit 119 advances the processing to step S40 where the measurement of the vehicle-terminal distance M is performed by the first distance measurement mode and then advances the processing to step S36. On the other hand, if the current time is not within the use estimated time period, the distance measurement control unit 119 advances the processing to step S34.

In step S34, the distance measurement control unit 119 determines whether the current time recognized by the current time recognizing unit 118 is within the non-use estimated time period or not. If the current time is within the non-use estimated time period, the distance measurement control unit 119 advances the processing to step S50 where the limitation of the measurement of the vehicle-terminal distance M by the third distance measurement mode is performed and then advances the processing to step S36. The condition that the current time is within the non-use estimated time period corresponds to a third predetermined condition of the present invention. On the other hand, if the current time is not within the non-use estimated time period, the distance measurement control unit 119 advances the processing to step S35.

In step S35, the distance measurement control unit 119 performs the measurement of the vehicle-terminal distance M by the second distance measurement mode. The distance measurement control unit 119 in the subsequent step S36, determines whether communication by BLE between the vehicle 100 and the mobile terminal 10 is established or not, and, if the communication is established, advances the processing to step S33 and, if the communication is disconnected, advances the processing to step S37.

In this manner, the distance measurement control unit 119 inhibits the measurement of the vehicle-terminal distance M by the distance measuring unit 112 as the third distance measurement mode in the non-use estimated time period that is estimated as having a low possibility that the user U uses the vehicle 100. The distance measurement control unit 119 measures the vehicle-terminal distance M limitedly if receiving the measurement instruction information Mri from the mobile terminal 10 as the second distance measurement mode in a time period, excluding the use estimated time period and non-use estimated time period, when the possibility that the user U uses the vehicle 100 is not clear. By performing the measurement of the vehicle-terminal distance M and the measurement limitation by the second and third distance measurement modes, power consumption by the measurement of the vehicle-terminal distance M can be reduced more than a case where the measurement of the vehicle-terminal distance M by the first distance measurement mode is performed at all times.

The distance measurement control unit 119 performs the measurement of the vehicle-terminal distance M by the distance measuring unit 112 as the first distance measurement mode in the use estimate time period estimated as having a high possibility that the user U uses the vehicle 100. Thus, in the use estimated time period, the vehicle-terminal distance M is quickly measured, and the use of the mobile terminal as the electronic key by the user U is quickly enabled so that the convenience to the user U can be enhanced.

If the use of the vehicle 100 is not recognized by the vehicle use presence/absence recognizing unit 114 within the use estimated time period, the vehicle use plan information obtaining unit 121 transmits vehicle use inquiry information that inquires about a use plan of the vehicle 100 to the mobile terminal 10. Then, the vehicle use plan information obtaining unit 121 obtains vehicle use answer information transmitted from the mobile terminal 10 in response to reception of the vehicle use inquiry information. The use estimated time period setting unit 116 changes the use estimated time period based on the use plan of the vehicle 100 by the user U, which is recognized from the vehicle use answer information.

5. Other Embodiments

In the above-described embodiment, the non-use estimated time period setting unit 117 is provided, and the distance measurement control unit 119 performs the measurement of the vehicle-terminal distance M by the distance measuring unit 112 and the measurement limitation by switching among the first to third distance measurement modes. As another configuration, the non-use estimated time period setting unit 117 may be omitted, and the distance measurement control unit 119 may perform the measurement of the vehicle-terminal distance M by the distance measuring unit 112 by switching between the first distance measurement mode and the second distance measurement mode. In this case, the measurement of the vehicle-terminal distance M by the second distance measurement mode is performed in a time period excluding the use estimated time period.

In the above-described embodiment, the use estimated time period setting unit 116 sets a use estimated time period based on the locked time and unlocked time recognized by the locked/unlocked time recognizing unit 113 and the schedule information obtained by the schedule information obtaining unit 115. As another embodiment, the use estimated time period setting unit 116 may set a use estimated time period based on any one or two of the locked time, the unlocked time and the schedule information. The non-use estimated time period setting unit 117 may set a non-use estimated time period based on any one or two of the locked time, the unlocked time and the schedule information.

In the above-described embodiment, if it is not recognized within the use estimated time period by the vehicle use presence/absence recognizing unit 114 that the vehicle 100 is used, the distance measurement control unit 119 may perform the measurement of the vehicle-terminal distance M by the second distance measurement mode next time in the time period set as the use estimated time period.

In the above-described embodiment, if a state where it is recognized by the vehicle use presence/absence recognizing unit 114 that the vehicle 100 is not used continues for a predetermined period of time or longer while the distance measurement control unit 119 is performing the measurement of the vehicle-terminal distance M by the first or second distance measurement mode, the measurement of the vehicle-terminal distance M by the third distance measurement mode may be performed. The condition that the state where it is recognized by the vehicle use presence/absence recognizing unit 114 that the vehicle 100 is not used continues for a predetermined period of time or longer corresponds to a second predetermined condition of the present invention.

FIGS. 1 to 3 are schematic diagrams showing the configurations of the mobile terminal 10 and the vehicle control apparatus 110 by dividing them based on main processing details for easy understanding of the present invention of the subject application, but the mobile terminal 10 and the vehicle control apparatus 110 may be configured based on other divisions. Processing by the constituent elements may be executed by one hardware unit or may be executed by a plurality of hardware units. The processing by the constituent elements shown in FIGS. 4 and 5 may be executed by one program or may be executed by a plurality of programs.

6. Configuration Supported by Embodiments Above

The embodiments above are specific examples of the following configuration.

(1) A vehicle control apparatus including a vehicle communication control unit performing communication with a mobile terminal used by a user of a vehicle when the mobile terminal positions within an out-vehicle communication area within a predetermined distance from the vehicle, a distance measuring unit measuring a vehicle-terminal distance, the vehicle-terminal distance being a distance between the vehicle and the mobile terminal, and a distance measurement control unit measuring the vehicle-terminal distance by switching, based on a predetermined condition, between a first distance measurement mode repeatedly measuring the vehicle-terminal distance by the distance measuring unit without depending on reception, by the vehicle communication control unit, of measurement instruction information transmitted from the mobile terminal and a second distance measurement mode measuring the vehicle-terminal distance by the distance measuring unit in response to reception, by the vehicle communication control unit, of the measurement instruction information transmitted from the mobile terminal when communication is established between the vehicle communication control unit and the mobile terminal.

According to the vehicle control apparatus under (1), the first distance measurement mode repeatedly measuring the vehicle-terminal distance by the distance measuring unit without depending on reception, by the vehicle communication control unit, of measurement instruction information transmitted from the mobile terminal and the second distance measurement mode measuring the vehicle-terminal distance by the distance measuring unit in response to reception, by the vehicle communication control unit, of the measurement instruction information transmitted from the mobile terminal are switched by the distance measurement control unit based on a predetermined condition when communication is established between the vehicle communication control unit and the mobile terminal. Thus, power consumption required for measurement of the vehicle-terminal distance can be reduced more than a case where the vehicle-terminal distance is repeatedly measured unconditionally by the first distance measurement mode when communication is established between the vehicle communication control unit and the mobile terminal.

(2) The vehicle control apparatus under (1), further including a use estimated time period setting unit setting a use estimated time period being a period when it is estimated that the user uses the vehicle, wherein, as the predetermined condition, a first predetermined condition that a current time is within the use estimated time period is set, and the distance measurement control unit performs measurement of the vehicle-terminal distance by the first distance measurement mode if the first predetermined condition is satisfied.

According to the vehicle control apparatus under (2), the vehicle-terminal distance is repeatedly measured by the first distance measurement mode in a use estimated time period having a high possibility that the user uses the vehicle so that processing based on the vehicle-terminal distance can be quickly performed when the user uses the vehicle.

(3) The vehicle control apparatus under (2), further including a locked/unlocked time recognizing unit recognizing a time when the vehicle is unlocked or locked, wherein the use estimated time period setting unit sets the use estimated time period based on a time when the vehicle is unlocked or locked recognized by the locked/unlocked time recognizing unit.

According to the vehicle control apparatus under (3), the use estimated time period can be set by recognizing a time when the user starts or finishes use of the vehicle based on a locked time or unlocked time of the vehicle.

(4) The vehicle control apparatus under (2) or (3), further including a schedule information obtaining unit obtaining schedule information including an action plan of the user, wherein the use estimated time period setting unit sets the use estimated time period based on the schedule information obtained by the schedule information obtaining unit.

According to the vehicle control apparatus under (4), the use estimated time period can be set by recognizing a use plan of the vehicle by the user from the schedule information.

(5) The vehicle control apparatus under any one of (2) to (4), further including a vehicle use presence/absence recognizing unit recognizing whether the vehicle is in use or not, wherein the distance measurement control unit performs measurement of the vehicle-terminal distance by the second distance measurement mode next time in a time period set as the use estimated time period if use of the vehicle is not recognized by the vehicle use presence/absence recognizing unit within the use estimated time period.

According to the vehicle control apparatus under (5), power consumption required for measurement of the vehicle-terminal distance can be reduced in accordance with a change of a use pattern of the vehicle by the user by performing next measurement of the vehicle-terminal distance by the second distance measurement mode in a time period set as the use estimated time period in accordance with the actual use state of the vehicle in the use estimated time period.

(6) The vehicle control apparatus under any one of (2) to (5), further including a vehicle use presence/absence recognizing unit recognizing whether the vehicle is in use or not, and a vehicle use plan information obtaining unit, if use of the vehicle is not recognized by the vehicle use presence/absence recognizing unit within the use estimated time period, transmitting vehicle use inquiry information inquiring about a plan for using the vehicle to the mobile terminal and obtaining, through the vehicle communication control unit, vehicle use answer information transmitted from the mobile terminal in response to reception of the vehicle use inquiry information, wherein the use estimated time period setting unit changes the use estimated time period based on the vehicle use answer information.

According to the vehicle control apparatus under (6), the use estimated time period can be changed by reflecting a use plan of the vehicle by the user based on the vehicle use answer information transmitted from the mobile terminal in response to reception of the vehicle use inquiry information.

(7) The vehicle control apparatus under any one of (1) to (6), wherein the distance measurement control unit performs measurement of the vehicle-terminal distance or limitation of measurement of the vehicle-terminal distance by switching, based on the predetermined condition, among a third distance measurement mode limiting measurement of the vehicle-terminal distance by the distance measuring unit, the first distance measurement mode and the second distance measurement mode.

According to the vehicle control apparatus under (7), power consumption required for measurement of the vehicle-terminal distance can further be reduced by setting the third distance measurement mode limiting the measurement of the vehicle-terminal distance. The limiting of the measurement of the vehicle-terminal distance includes measures such as inhibiting the measurement of the vehicle-terminal distance or reducing the frequency of measurement of the vehicle-terminal distance more than that of the first distance measurement mode.

(8) The vehicle control apparatus under (7), further including a vehicle use presence/absence recognizing unit recognizing whether the vehicle is in use or not, wherein, as the predetermined condition, a second predetermined condition is set, the second predetermined condition being that a state where it is recognized by the vehicle use presence/absence recognizing unit that the vehicle is not used continues for a predetermined period of time or longer, and the distance measurement control unit limits measurement of the vehicle-terminal distance by switching to the third distance measurement mode if the second predetermined condition is satisfied while measurement of the vehicle-terminal distance is being performed by the first distance measurement mode or the second distance measurement mode.

According to the vehicle control apparatus under (8), the power consumption required for measurement of the vehicle-terminal distance can further be reduced by switching to the third distance measurement mode if a state where the vehicle is not used continues in the first distance measurement mode or the second distance measurement mode.

(9) The vehicle control apparatus under (7) or (8), further including a non-use estimated time period setting unit setting a non-use estimated time period being a time period estimated as that the user does not use the vehicle, wherein, as the predetermined condition, a third predetermined condition that a current time is within the non-use estimated time period is set, and, if the third predetermined condition is satisfied, the distance measuring unit limits measurement of the vehicle-terminal distance by the third distance measurement mode.

According to the vehicle control apparatus under (9), the power consumption required for measurement of the vehicle-terminal distance can further be reduced by setting a non-use estimated time period in advance and limiting the measurement of the vehicle-terminal distance by the third distance measurement mode.

(10) A vehicle control method to be executed by a vehicle control apparatus performing communication with a mobile terminal used by a user of a vehicle, the method including a vehicle communication control step of performing communication with the mobile terminal when the mobile terminal positions within an out-vehicle communication area within a predetermined distance from the vehicle, a distance measuring step of measuring a vehicle-terminal distance, the vehicle-terminal distance being a distance between the vehicle and the mobile terminal, and a distance measurement control step of measuring the vehicle-terminal distance by switching, based on a predetermined condition, between a first distance measurement mode repeatedly measuring the vehicle-terminal distance by the distance measuring step without depending on reception, by the vehicle communication control step, of measurement instruction information transmitted from the mobile terminal and a second distance measurement mode measuring the vehicle-terminal distance by the distance measuring step in response to reception, by the vehicle communication control step, of the measurement instruction information transmitted from the mobile terminal when communication is established between the vehicle control apparatus and the mobile terminal by the vehicle communication control step.

The configuration of the vehicle control apparatus under (1) above can be implemented by executing the vehicle control method under (10) by the vehicle control apparatus.

(11) A recording medium with a program for control recorded, the recording medium being installed in a vehicle control apparatus performing communication with a mobile terminal used by a user of a vehicle, the program causing the vehicle control apparatus to function as a vehicle communication control unit performing communication with the mobile terminal when the mobile terminal positions within an out-vehicle communication area within a predetermined distance from the vehicle, a distance measuring unit measuring a vehicle-terminal distance, the vehicle-terminal distance being a distance between the vehicle and the mobile terminal, and a distance measurement control unit measuring the vehicle-terminal distance by switching, based on a predetermined condition, between a first distance measurement mode repeatedly measuring the vehicle-terminal distance by the distance measuring unit without depending on reception, by the vehicle communication control unit, of measurement instruction information transmitted from the mobile terminal and a second distance measurement mode measuring the vehicle-terminal distance by the distance measuring unit in response to reception, by the vehicle communication control unit, of the measurement instruction information transmitted from the mobile terminal when communication is established between the vehicle communication control unit and the mobile terminal.

The configuration of the vehicle control apparatus under (1) above can be implemented by executing the program for control under (11) by the vehicle control apparatus.

(12) A vehicle control system including a mobile terminal used by a user of a vehicle, and a vehicle control apparatus mounted on the vehicle and having a vehicle communication control unit performing communication with the mobile terminal, and a distance measuring unit measuring a vehicle-terminal distance, the vehicle-terminal distance being a distance between the vehicle and the mobile terminal, wherein the mobile terminal and the vehicle communication control unit establish communication when the mobile terminal positions within an out-vehicle communication area of the vehicle communication control unit within a predetermined distance from the vehicle, the mobile terminal transmits, to the vehicle communication control unit, measurement instruction information instructing to measure the vehicle-terminal distance by the distance measuring unit if a predetermined distance measurement execution condition is satisfied, and the vehicle control apparatus has a distance measurement control unit measuring the vehicle-terminal distance by switching, based on a predetermined condition, between a first distance measurement mode repeatedly measuring the vehicle-terminal distance by the distance measuring unit without depending on reception, by the vehicle communication control unit, of the measurement instruction information transmitted from the mobile terminal and a second distance measurement mode measuring the vehicle-terminal distance by the distance measuring unit in response to reception, by the vehicle communication control unit, of the measurement instruction information transmitted from the mobile terminal when communication is established between the vehicle communication control unit and the mobile terminal.

According to the vehicle control system under (12), the first distance measurement mode repeatedly measuring the vehicle-terminal distance by the distance measuring unit without depending on reception, by the vehicle communication control unit, of measurement instruction information transmitted from the mobile terminal and the second distance measurement mode measuring the vehicle-terminal distance by the distance measuring unit in response to reception, by the vehicle communication control unit, of the measurement instruction information transmitted from the mobile terminal are switched by the distance measurement control unit based on a predetermined condition when communication is established between the vehicle communication control unit and the mobile terminal. Thus, power consumption required for measurement of the vehicle-terminal distance can be reduced more than a case where the vehicle-terminal distance is repeatedly measured unconditionally by the first distance measurement mode when communication is established between the vehicle communication control unit and the mobile terminal.

REFERENCE SIGNS LIST

1: vehicle control system, 10: mobile terminal, 100: vehicle, 110: vehicle control apparatus, 111: vehicle communication control unit, 112: distance measuring unit, 113: locked/unlocked time recognizing unit, 114: vehicle use presence/absence recognizing unit, 115: schedule information obtaining unit, 116: use estimated time period setting unit, 117: non-use estimated time period setting unit, 118: current time recognizing unit, 119: distance measurement control unit, 120: vehicle electronic-key control unit, 121: vehicle use plan information obtaining unit, 125: memory, 126: program for control, 127: vehicle use reference data, 130: first vehicle communication unit, 131: BLE antenna, 140: second vehicle communication unit, 141, 142, 143: UWB antenna, U: user

What is claimed is:

1. A vehicle control apparatus comprising a central processing unit (CPU) including:
    a vehicle communication control unit performing communication with a mobile terminal used by a user of a vehicle when the mobile terminal positions within an out-vehicle communication area within a predetermined distance from the vehicle;
    a distance measuring unit measuring a vehicle-terminal distance, the vehicle-terminal distance being a distance between the vehicle and the mobile terminal; and
    a distance measurement control unit measuring the vehicle-terminal distance by switching, based on a predetermined condition, between a first distance measurement mode repeatedly measuring the vehicle-terminal distance by the distance measuring unit without depending on reception, by the vehicle communication control unit, of measurement instruction information transmitted from the mobile terminal and a second distance measurement mode measuring the vehicle-terminal distance by the distance measuring unit in response to reception, by the vehicle communication control unit, of the measurement instruction information transmitted from the mobile terminal when communication is established between the vehicle communication control unit and the mobile terminal.

2. The vehicle control apparatus according to claim 1, wherein the CPU further includes:
    a use estimated time period setting unit setting a use estimated time period being a period when it is estimated that the user uses the vehicle,
    wherein, as the predetermined condition, a first predetermined condition that a current time is within the use estimated time period is set, and
    the distance measurement control unit performs measurement of the vehicle-terminal distance by the first distance measurement mode if the first predetermined condition is satisfied.

3. The vehicle control apparatus according to claim 2, wherein the CPU further includes:
    a locked/unlocked time recognizing unit recognizing a time when the vehicle is unlocked or locked,
    wherein the use estimated time period setting unit sets the use estimated time period based on a time when the vehicle is unlocked or locked recognized by the locked/unlocked time recognizing unit.

4. The vehicle control apparatus according to claim 2, wherein the CPU further includes:
    a schedule information obtaining unit obtaining schedule information including an action plan of the user,
    wherein the use estimated time period setting unit sets the use estimated time period based on the schedule information obtained by the schedule information obtaining unit.

5. The vehicle control apparatus according to claim 2, wherein the CPU further includes:
    a vehicle use presence/absence recognizing unit recognizing whether the vehicle is in use or not,
    wherein the distance measurement control unit performs measurement of the vehicle-terminal distance by the second distance measurement mode next time in a time period set as the use estimated time period if use of the vehicle is not recognized by the vehicle use presence/absence recognizing unit within the use estimated time period.

6. The vehicle control apparatus according to claim 2, wherein the CPU further includes:
- a vehicle use presence/absence recognizing unit recognizing whether the vehicle is in use or not; and
- a vehicle use plan information obtaining unit, if use of the vehicle is not recognized by the vehicle use presence/absence recognizing unit within the use estimated time period, transmitting vehicle use inquiry information inquiring about a plan for using the vehicle to the mobile terminal and obtaining, through the vehicle communication control unit, vehicle use answer information transmitted from the mobile terminal in response to reception of the vehicle use inquiry information,
- wherein the use estimated time period setting unit changes the use estimated time period based on the vehicle use answer information.

7. The vehicle control apparatus according to claim 1, wherein the distance measurement control unit performs measurement of the vehicle-terminal distance or limitation of measurement of the vehicle-terminal distance by switching, based on the predetermined condition, among a third distance measurement mode limiting measurement of the vehicle-terminal distance by the distance measuring unit, the first distance measurement mode and the second distance measurement mode.

8. The vehicle control apparatus according to claim 7, wherein the CPU further includes:
- a vehicle use presence/absence recognizing unit recognizing whether the vehicle is in use or not,
- wherein, as the predetermined condition, a second predetermined condition is set, the second predetermined condition being that a state where it is recognized by the vehicle use presence/absence recognizing unit that the vehicle is not used continues for a predetermined period of time or longer, and
- the distance measurement control unit limits measurement of the vehicle-terminal distance by switching to the third distance measurement mode if the second predetermined condition is satisfied while measurement of the vehicle-terminal distance is being performed by the first distance measurement mode or the second distance measurement mode.

9. The vehicle control apparatus according to claim 7, wherein the CPU further includes:
- a non-use estimated time period setting unit setting a non-use estimated time period being a time period estimated as that the user does not use the vehicle,
- wherein, as the predetermined condition, a third predetermined condition that a current time is within the non-use estimated time period is set, and
- if the third predetermined condition is satisfied, the distance measuring unit limits measurement of the vehicle-terminal distance by the third distance measurement mode.

10. A vehicle control method to be executed by a vehicle control apparatus performing communication with a mobile terminal used by a user of a vehicle, the method comprising:
- a vehicle communication control step of performing communication with the mobile terminal when the mobile terminal positions within an out-vehicle communication area within a predetermined distance from the vehicle;
- a distance measuring step of measuring a vehicle-terminal distance, the vehicle-terminal distance being a distance between the vehicle and the mobile terminal; and
- a distance measurement control step of measuring the vehicle-terminal distance by switching, based on a predetermined condition, between a first distance measurement mode repeatedly measuring the vehicle-terminal distance by the distance measuring step without depending on reception, by the vehicle communication control step, of measurement instruction information transmitted from the mobile terminal and a second distance measurement mode measuring the vehicle-terminal distance by the distance measuring step in response to reception, by the vehicle communication control step, of the measurement instruction information transmitted from the mobile terminal when communication is established between the vehicle control apparatus and the mobile terminal by the vehicle communication control step.

11. A non-transitory computer readable recording medium with a program for control recorded, the recording media being installed in a vehicle control apparatus performing communication with a mobile terminal used by a user of a vehicle, the program causing the vehicle control apparatus to function as:
- a vehicle communication control unit performing communication with the mobile terminal when the mobile terminal positions within an out-vehicle communication area within a predetermined distance from the vehicle;
- a distance measuring unit measuring a vehicle-terminal distance, the vehicle-terminal distance being a distance between the vehicle and the mobile terminal; and
- a distance measurement control unit measuring the vehicle-terminal distance by switching, based on a predetermined condition, between a first distance measurement mode repeatedly measuring the vehicle-terminal distance by the distance measuring unit without depending on reception, by the vehicle communication control unit, of measurement instruction information transmitted from the mobile terminal and a second distance measurement mode measuring the vehicle-terminal distance by the distance measuring unit in response to reception, by the vehicle communication control unit, of the measurement instruction information transmitted from the mobile terminal when communication is established between the vehicle communication control unit and the mobile terminal.

12. A vehicle control system comprising:
- a mobile terminal used by a user of a vehicle; and
- a vehicle control apparatus mounted on the vehicle and having a central processing unit (CPU) that includes a vehicle communication control unit performing communication with the mobile terminal, and a distance measuring unit measuring a vehicle-terminal distance, the vehicle-terminal distance being a distance between the vehicle and the mobile terminal,
- wherein the mobile terminal and the vehicle communication control unit establish communication when the mobile terminal positions within an out-vehicle communication area of the vehicle communication control unit within a predetermined distance from the vehicle,
- the mobile terminal transmits, to the vehicle communication control unit, measurement instruction information instructing to measure the vehicle-terminal distance by the distance measuring unit if a predetermined distance measurement execution condition is satisfied, and
- the CPU of the vehicle control apparatus has a distance measurement control unit measuring the vehicle-terminal distance by switching, based on a predetermined condition, between a first distance measurement mode repeatedly measuring the vehicle-terminal distance by the distance measuring unit without depending on reception, by the vehicle communication control unit, of the measurement instruction information transmitted from the mobile terminal and a second distance measurement mode measuring the vehicle-terminal distance by the distance measuring unit in response to reception, by the vehicle communication control unit, of the measurement instruction information transmitted from the mobile terminal when communication is established between the vehicle communication control unit and the mobile terminal.

* * * * *